F. C. Heiser,

Liquid Measure.

No. 106,816.　　　　　Patented Aug. 30, 1870.

Witnesses:　　　　　Inventor:

United States Patent Office.

FRANCIS C. HEISER, OF BROOKLYN, NEW YORK.

Letters Patent No. 106,816, dated August 30, 1870.

IMPROVEMENT IN MEASURING FAUCETS.

The Schedule referred to in these Letters Patent and making part of the same.

To all whom it may concern:

Be it known that I, FRANCIS C. HEISER, of Brooklyn, in the county of Kings and State of New York, have invented a new and improved Measuring-Faucet; and I do hereby declare that the following is a full, clear, and exact description thereof, which will enable others skilled in the art to make and use the same, reference being had to the accompanying drawing forming part of this specification.

Similar letters of reference indicate corresponding parts.

Figure 1:
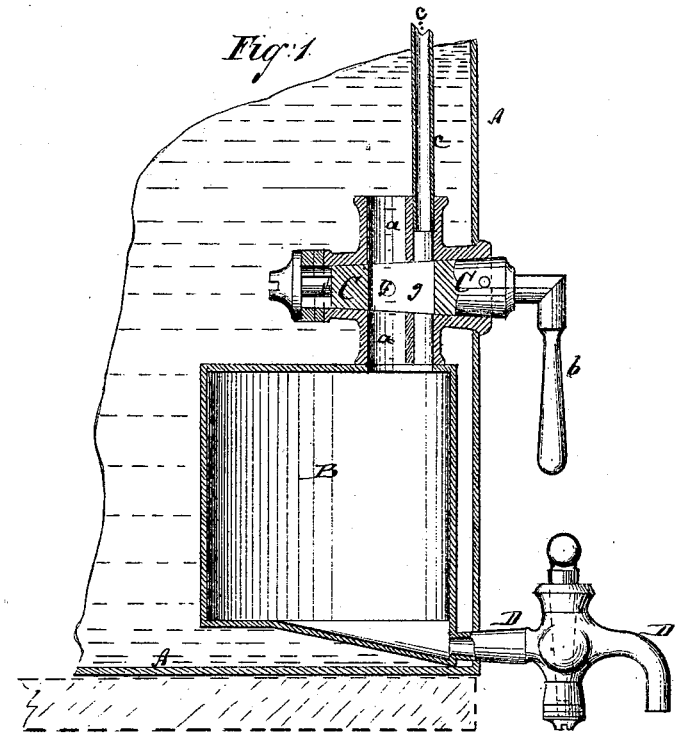
Figure 1 represents a vertical section of my improved measuring-faucet.
Figure 2:
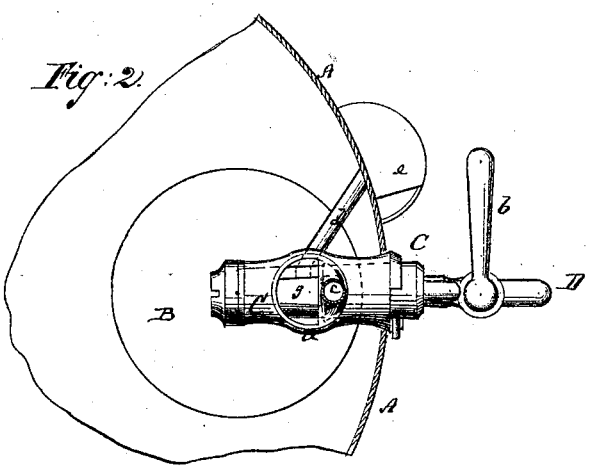
Figure 2 is a plan or top view of the same.

My invention relates to devices for measuring liquids directly from the cask or barrel; and It consists in an improvement in the relative construction and arrangement of parts for that purpose.

A in the drawing represents a portion of the can, cask, or other vessel, to which my improved measuring-faucet is to be applied.

Upon the bottom of this vessel are placed a suitable number of vessels, B B, as many as may be required. Thus there may be used for retailing burning-fluid, molasses, or other liquid, pint, quart, and gallon measures. Where the system of measures is different, the sizes of the several vessel will vary accordingly.

Each measure, B, is covered, and has a pipe, $a$, projecting from its top.

In this pipe is arranged a stop-cock, C, which, when opened, allows the liquid from the main cask to enter the measuring-vessel.

The handle B of the stop-cock projects through the side of the case A, and can be turned at will.

A pipe, $c$, projects from the pipe $a$ up to the upper part of the case A, and is in line with the orifice of the stop-cock when the same is opened to let the air escape from the measure to the upper part of the case.

A faucet, D, in the lower part of the measure, serves to draw off the liquid.

The cock C is first opened to let the liquor flow into the vessel B. When the same is full the cock is closed, and the faucet D opened to withdraw the desired quantity of liquor.

From the pipe $a$ projects a branch-pipe, $d$, which leads through the side of the case A into a small hopper, $e$.

Through the pipe $d$ air can enter the measuring-vessel while the liquor is being withdrawn.

The cock C has an aperture, $f$, at right angles to its main orifice $g$.

When the cock is closed the orifice $g$ is in communication with the pipe $d$, and the opening $f$ with the vessel B, so that air may, from the pipe, enter the said vessel.

Each measuring vessel is provided with a separate cock-faucet and system of pipes, as herein specified.

Having thus described my invention,

I claim as new and desire to secure by Letters Patent—

The cock C, pipes $a$ $c$ $d$, handle $b$, faucet D, hopper $e$, and orifice $f$ $g$, arranged with respect to each other, and to a measure B, as and for the purpose specified.

FRANCIS C. HEISER.

Witnesses:
ARTHUR V. BRIESEN,
T. B. MOSHER.